(12) United States Patent
Dawson et al.

(10) Patent No.: US 7,944,878 B2
(45) Date of Patent: May 17, 2011

(54) FILTERING IN BANDWIDTH SHARING AD HOC NETWORKS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 11/755,776

(22) Filed: May 31, 2007

(65) Prior Publication Data

US 2008/0298238 A1    Dec. 4, 2008

(51) Int. Cl.
*H04W 4/00*    (2009.01)
(52) U.S. Cl. ......... 370/329; 370/338; 370/235; 455/433
(58) Field of Classification Search .......... 370/328–338; 709/217–219, 223–229; 726/2–30
See application file for complete search history.

(56) References Cited

U.S. PATENT DOCUMENTS

| | | | |
|---|---|---|---|
| 5,437,054 A | 7/1995 | Rappaport et al. | |
| 5,490,201 A * | 2/1996 | Moberg et al. | 455/433 |
| 5,953,338 A | 9/1999 | Ma et al. | |
| 6,006,084 A * | 12/1999 | Miller et al. | 455/406 |
| 6,035,281 A | 3/2000 | Crosskey et al. | |
| 6,047,268 A | 4/2000 | Bartoli et al. | |
| 6,396,805 B2 | 5/2002 | Romrell | |
| 6,397,061 B1 | 5/2002 | Jordan et al. | |
| 6,522,735 B1 | 2/2003 | Fortman et al. | |
| 6,763,248 B1 | 7/2004 | Odamura | |
| 6,810,428 B1 | 10/2004 | Larsen et al. | |
| 6,941,378 B2 | 9/2005 | Apostolopoulos et al. | |
| 6,954,790 B2 | 10/2005 | Forslöw | |
| 6,961,575 B2 | 11/2005 | Stanforth | |
| 6,975,613 B1 | 12/2005 | Johansson | |
| 6,980,511 B1 | 12/2005 | Li | |
| 7,016,375 B1 | 3/2006 | Rosenberg et al. | |
| 7,028,096 B1 | 4/2006 | Lee | |
| 7,075,890 B2 | 7/2006 | Ozer et al. | |

(Continued)

FOREIGN PATENT DOCUMENTS

EP    0999662    5/2005

(Continued)

OTHER PUBLICATIONS

Luo, Haiyun, Ramachandran Ramjee, Prasun Sinha, Li (. Li, and Songwu Lu. "UCAN: a unified cellular and ad-hoc network architecture." MobiCom '03: Proceedings of the 9th annual international conference on Mobile computing and networking. New York, NY, USA: ACM Press, 2003, 353-367.*

(Continued)

*Primary Examiner* — Kent Chang
*Assistant Examiner* — Kashif Siddiqui
(74) *Attorney, Agent, or Firm* — William Schiesser; Roberts Mlotkowski Safran & Cole, P.C.

(57) ABSTRACT

Systems and methods for filtering in bandwidth sharing ad hoc networks. A method includes maintaining at least one filtering parameter associated with formation of a bandwidth sharing ad hoc network. The method further includes preventing data transfer across the bandwidth sharing ad hoc network when a parameter of a request to establish the bandwidth sharing ad hoc network corresponds to the at least one filtering parameter.

30 Claims, 11 Drawing Sheets

U.S. PATENT DOCUMENTS

| | | | |
|---|---|---|---|
| 7,085,281 B2 | 8/2006 | Thomas et al. | |
| 7,130,283 B2 | 10/2006 | Vogel et al. | |
| 7,240,015 B1 | 7/2007 | Karmouch et al. | |
| 7,340,759 B1 | 3/2008 | Rodriguez | |
| 7,447,656 B2 | 11/2008 | Parthasarathy | |
| 7,450,517 B2 | 11/2008 | Cho | |
| 7,530,102 B2 | 5/2009 | Moskowitz | |
| 7,788,133 B2 | 8/2010 | Delenda | |
| 7,830,834 B2 | 11/2010 | Das et al. | |
| 2001/0029182 A1* | 10/2001 | McCann et al. | 455/433 |
| 2002/0053033 A1* | 5/2002 | Cooper et al. | 713/201 |
| 2002/0053082 A1* | 5/2002 | Weaver et al. | 725/46 |
| 2002/0058499 A1* | 5/2002 | Ortiz | 455/412 |
| 2002/0069278 A1 | 6/2002 | Forslöw | |
| 2002/0102987 A1 | 8/2002 | Souisse et al. | |
| 2002/0110110 A1* | 8/2002 | Tiihonen et al. | 370/347 |
| 2002/0120873 A1* | 8/2002 | Salmivalli | 713/201 |
| 2002/0122410 A1 | 9/2002 | Kulikov et al. | |
| 2002/0141358 A1* | 10/2002 | Requena | 370/329 |
| 2002/0145978 A1 | 10/2002 | Batsell et al. | |
| 2003/0068975 A1 | 4/2003 | Qiao et al. | |
| 2003/0117978 A1 | 6/2003 | Haddad | |
| 2003/0120594 A1 | 6/2003 | Shaginaw et al. | |
| 2003/0137976 A1* | 7/2003 | Zhu et al. | 370/354 |
| 2003/0139180 A1 | 7/2003 | McIntosh et al. | |
| 2003/0153338 A1 | 8/2003 | Herz et al. | |
| 2003/0235174 A1 | 12/2003 | Pichna et al. | |
| 2004/0006621 A1* | 1/2004 | Bellinson et al. | 709/225 |
| 2004/0029553 A1 | 2/2004 | Cain | |
| 2004/0064351 A1 | 4/2004 | Mikurak | |
| 2004/0100929 A1 | 5/2004 | Garcia-Luna-Aceves | |
| 2004/0128231 A1 | 7/2004 | Morita | |
| 2004/0156312 A1 | 8/2004 | Salonidis et al. | |
| 2004/0162871 A1 | 8/2004 | Pabla et al. | |
| 2004/0165548 A1 | 8/2004 | Backes | |
| 2004/0185777 A1 | 9/2004 | Bryson | |
| 2004/0192204 A1 | 9/2004 | Periyalwar et al. | |
| 2004/0260808 A1 | 12/2004 | Strutt | |
| 2004/0264466 A1 | 12/2004 | Huang | |
| 2005/0063419 A1 | 3/2005 | Schrader et al. | |
| 2005/0080872 A1 | 4/2005 | Davis et al. | |
| 2005/0153725 A1 | 7/2005 | Naghian et al. | |
| 2005/0157661 A1 | 7/2005 | Cho | |
| 2005/0169209 A1 | 8/2005 | Miu et al. | |
| 2005/0169257 A1 | 8/2005 | Lahetkangas et al. | |
| 2005/0193221 A1* | 9/2005 | Yoneyama | 713/201 |
| 2005/0203834 A1 | 9/2005 | Prieston | |
| 2005/0213503 A1 | 9/2005 | Guo et al. | |
| 2006/0002326 A1 | 1/2006 | Vesuna | |
| 2006/0034330 A1 | 2/2006 | Iwamura | |
| 2006/0085543 A1 | 4/2006 | Hrastar et al. | |
| 2006/0095582 A1 | 5/2006 | Nitya et al. | |
| 2006/0114853 A1 | 6/2006 | Hasty et al. | |
| 2006/0126504 A1 | 6/2006 | Meier et al. | |
| 2006/0167784 A1 | 7/2006 | Hoffberg | |
| 2006/0176829 A1 | 8/2006 | McLaughlin et al. | |
| 2006/0179143 A1 | 8/2006 | Walker et al. | |
| 2006/0187858 A1 | 8/2006 | Kenichi et al. | |
| 2006/0193295 A1 | 8/2006 | White et al. | |
| 2006/0224502 A1 | 10/2006 | McGowan | |
| 2007/0005797 A1 | 1/2007 | Fontijn et al. | |
| 2007/0117537 A1 | 5/2007 | Hui et al. | |
| 2007/0140272 A1 | 6/2007 | Gulliksson | |
| 2008/0008140 A1 | 1/2008 | Forssell | |
| 2008/0040481 A1 | 2/2008 | Joshi et al. | |
| 2008/0167982 A1 | 7/2008 | Leo et al. | |
| 2008/0281529 A1 | 11/2008 | Tenenbaum et al. | |

FOREIGN PATENT DOCUMENTS

| | | |
|---|---|---|
| WO | 9915960 | 4/1999 |
| WO | 03 037009 | 5/2003 |
| WO | 04 001585 | 12/2003 |
| WO | 2006 004628 | 1/2006 |

OTHER PUBLICATIONS

D. Zhu et al., "QoS Aware Wireless Bandwidth Aggregation (QAWBA) by Integrating Cellular and Ad-hoc Networks."

D. Zhu et al., "Using Cooperative Multiple Paths to Reduce File Download Latency in Cellular Data Networks."

Non-final Office Action dated Dec. 23, 2008 in U.S. Appl. No. 11/755,806.

Final Office Action dated Jun. 3, 2009 in U.S. Appl. No. 11/755,806.

Final Office Action dated Jun. 9, 2009 in U.S. Appl. No. 11/755,806.

Non-final Office Action dated Oct. 19, 2009 in U.S. Appl. No. 11/755,788.

Qui et al.. "Bandwidth in Ad Hoc Networks: A Price-Based Approach," 2003, IEEE, pp. 1-10.

Non-final Office Action dated Jan. 22, 2010 in U.S. Appl. No. 11/755,778.

Non-final Office Action dated Jan. 21, 2010 in U.S. Appl. No. 11/755,808.

Non-Final Office Action dated Mar. 4, 2010 in U.S. Appl. No. 11/755,775.

Final Office Action dated Mar. 5, 2010 in U.S. Appl. No. 11/755,788.

Non-Final Office Action dated Mar. 22, 2010 in U.S. Appl. No. 11/755,782.

Non-Final Office Action dated Mar. 18, 2010 in U.S. Appl. No. 11/755,763.

Non-Final Office Action dated Jan. 25, 2010 in U.S. Appl. No. 11/755,771.

Notice of Allowance dated Aug. 25, 2010 in U.S. Appl. No. 11/755,780.

Office Action dated Sep. 14, 2010 in U.S. Appl. No. 11/755,788.

Final Office Action dated Sep. 15, 2010 in U.S. Appl. No. 11/755,782.

Notice of Allowance dated Oct. 12, 2010 in U.S. Appl. No. 11/755,808.

Office Action dated Oct. 29, 2010 in U.S. Appl. No. 11/755,786.

IEEE 802.22, Wireless RANs, 220 pages, Mar. 2006.

Michelini et al, Spectral Sharing Across 2G-3G Systems, IEEE, 5 pages, 2003.

Das et al, A Structured Channel Borrowing Scheme for Dynamic Load Balancing in Cellular Networks, IEEE, 8 pages, 1997.

Office Action dated Jun. 4, 2010 in U.S. Appl. No. 11/755,780.

Office Action dated Jul. 12, 2010 in U.S. Appl. No. 11/755,808.

Notice of Allowance dated Jun. 9, 2010 in U.S. Appl. No. 11/755,802.

Notice of Allowance dated Jun. 28, 2010 in U.S. Appl. No. 11/755,771.

Notice of Allowance dated Jul. 13, 2010 in U.S. Appl. No. 11/755,778.

Notice of Allowance dated Aug. 16, 2010 in U.S. Appl. No. 11/755,763.

Final Office Action dated Nov. 26, 2010 in U.S. Appl. No. 11/755,775.

Office Action dated Jan. 24, 2011 in U.S. Appl. No. 11/755,779.

Notice of Allowance dated Feb. 14, 2011 in U.S. Appl. No. 11/755,788.

Office Action dated Mar. 3, 2011 in U.S. Appl. No. 11/755,800.

* cited by examiner

| Node Name | Node Type | Location | File Requested for Transfer | Price | Service Level Objective | Current Quality of Service |
|---|---|---|---|---|---|---|
| | | | | | | |
| | | | | | | |

FIG. 4

FILTERING IN BANDWIDTH SHARING AD HOC NETWORKS

CROSS-REFERENCE TO RELATED APPLICATIONS

This application is related to the following copending applications, all of which are incorporated herein by reference in their entireties: Copending application Ser. No. 11/755,780, published as U.S. Pub. No. 2008/0298327; copending application Ser. No. 11/755,775, published as U.S. Pub. No. 2008/0301017; and copending application Ser. No. 11/755,808, published as U.S. Pub. No. 2008/0301017.

FIELD OF THE INVENTION

The invention generally relates to systems and methods for data transfer and, more particularly, to systems and methods for filtering data transfer in bandwidth sharing ad hoc networks.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE in the United States, other countries, or both), Bluetooth® (registered trademark of BLUETOOTH SIG, INC. in the United States, other countries, or both), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises maintaining at least one filtering parameter associated with formation of a bandwidth sharing ad hoc network. The method also comprises preventing data transfer across the bandwidth sharing ad hoc network when a parameter of a request to establish the bandwidth sharing ad hoc network corresponds to the at least one filtering parameter.

In another aspect of the invention, a method comprises receiving a request from a borrower to lend bandwidth to the borrower in an ad hoc network. The method further comprises comparing the request to at least one filtering parameter and denying or granting the request based upon the comparing.

In another aspect of the invention, a method comprises providing a computer infrastructure operable to store at least one filtering parameter. The computer infrastructure is further operable to, based upon a request of a borrower to establish a bandwidth sharing ad hoc network, at least one of: transmit the at least one filtering parameter to a lender, and prevent data transfer for the borrower across the ad hoc network based upon the at least one filtering parameter.

In another aspect of the invention, there is a computer program product comprising a computer usable medium having a computer readable program embodied in the medium, wherein the computer readable program when executed on a computing device causes the computing device to: maintain at least one filtering parameter associated with formation of a bandwidth sharing ad hoc network; and, based upon the at least one filtering parameter, at least one of: provide the at least one filtering parameter to a lender of the ad hoc network, and prevent data transfer across the ad hoc network.

In another aspect of the invention, there is a system comprising a server having a database containing data associated with a borrower, and at least one of a hardware and software component configured to: maintain at least one filtering parameter; compare a request of the borrower to borrow bandwidth from a lender to the at least one filtering parameter; and deny or grant the request based upon the comparing.

BRIEF DESCRIPTION OF THE DRAWINGS

FIG. 4 shows an example table created and used in implementing aspects of the invention.

DETAILED DESCRIPTION OF EMBODIMENTS OF THE INVENTION

The invention generally relates to systems and methods for data transfer and, more particularly, to systems and methods for data transfer in bandwidth sharing ad hoc networks. The invention allows a device with a relatively low bandwidth (e.g., low rate of data transfer) to leverage the bandwidth of other local devices to create a virtual high bandwidth (e.g., high rate of data transfer) connection. In exemplary implementations of the invention, an ad hoc network of wireless devices is established for transferring data from a remote location or locations to a member of the network via other members of the network. Alternatively, data may be transferred from a single member of the network to a remote location or locations via the other members of the network. In this manner, data may be transferred (e.g., downloaded, uploaded, etc.) in a parallel fashion, instead of serial fashion, thereby improving the speed and efficiency of data transfer. Moreover, implementations of the invention provide filtering systems and methods for selectively controlling the type of data that is transferred using such bandwidth sharing ad hoc networks.

Figure 1:
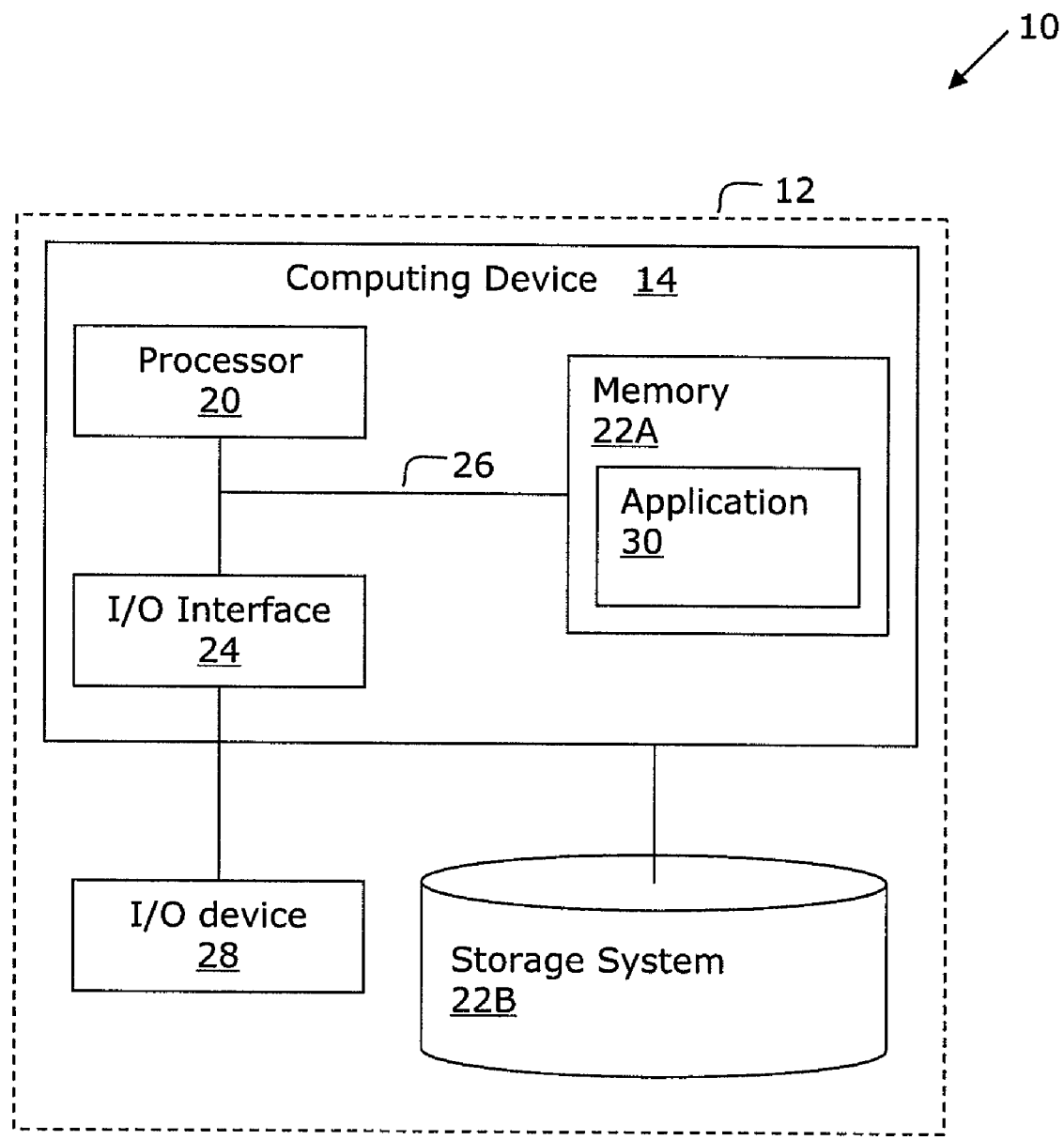
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes the computing device 14 operable to perform the processes described herein, e.g., establish ad hoc networks, transfer data over ad hoc networks, controlling the lending bandwidth based upon predetermined factors, etc. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein, such as, for example, provide fair-sharing strategies. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Embodiments

"Ad hoc" relationships will become increasingly important in the communal sharing of immediately available resources, and most particularly, the sharing of bandwidth. With the creation of peer-to-peer networks and torrent-type services, a file may be stored in more than one location to allow very fast download of the file in sections simultaneously from multiple locations. Groups of devices may congregate, or coexist, in one place and each may have limited bandwidth to the outside world. However, the groups of devices may have high bandwidth to other devices within close proximity. An example of this is an IEEE 802.11g local area connection that creates a high-speed wireless connection between two cellular phone devices within close range, and wherein the cellular phones' cellular (e.g., wireless telephony) connection to remote locations provides bandwidth at less than $1/100^{th}$ of the local IEEE 802.11g connection.

The present invention is directed to systems and methods for selectively controlling, via filtering, the data that is transferred using bandwidth sharing ad hoc networks. Illustrative cases of data transfer to/from remote locations using peer-to-peer (P2P), non-gateway implementations are set forth in co-pending Application Ser. No. 11/755,808, Illustrative cases of data transfer to/from a remote location using gateway implementations are set forth in co-pending application Ser. No. 11/755,780.

Figure 2A:
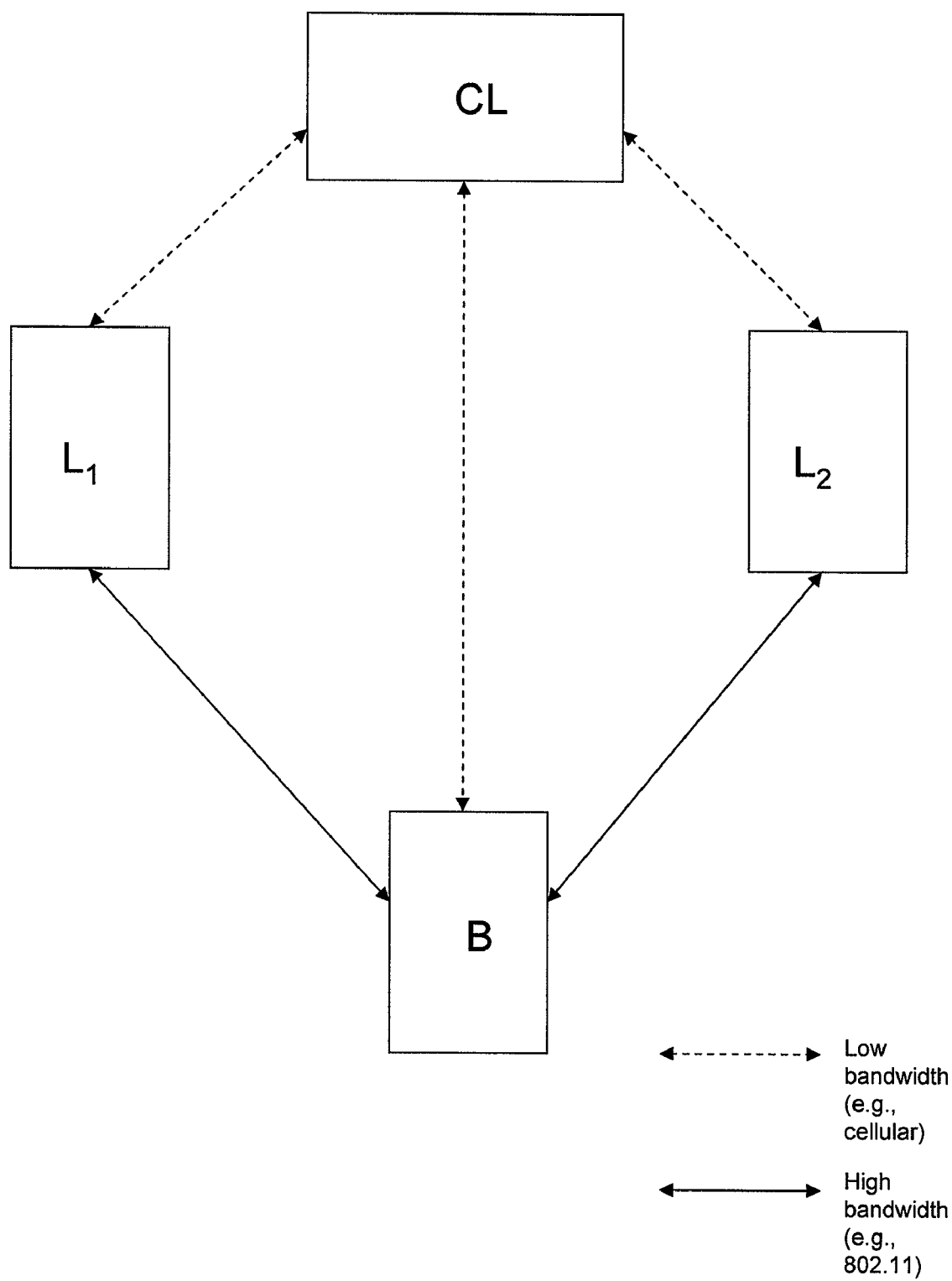
FIGS. 2A through 2D show peer-to-peer bandwidth-sharing ad hoc networks according to aspects of the invention.

FIGS. 2A through 2D show a general overview of a non-gateway, peer-to-peer (P2P) bandwidth sharing architecture. In these implementations, as shown in FIG. 2A, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess (e.g., currently unused) bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
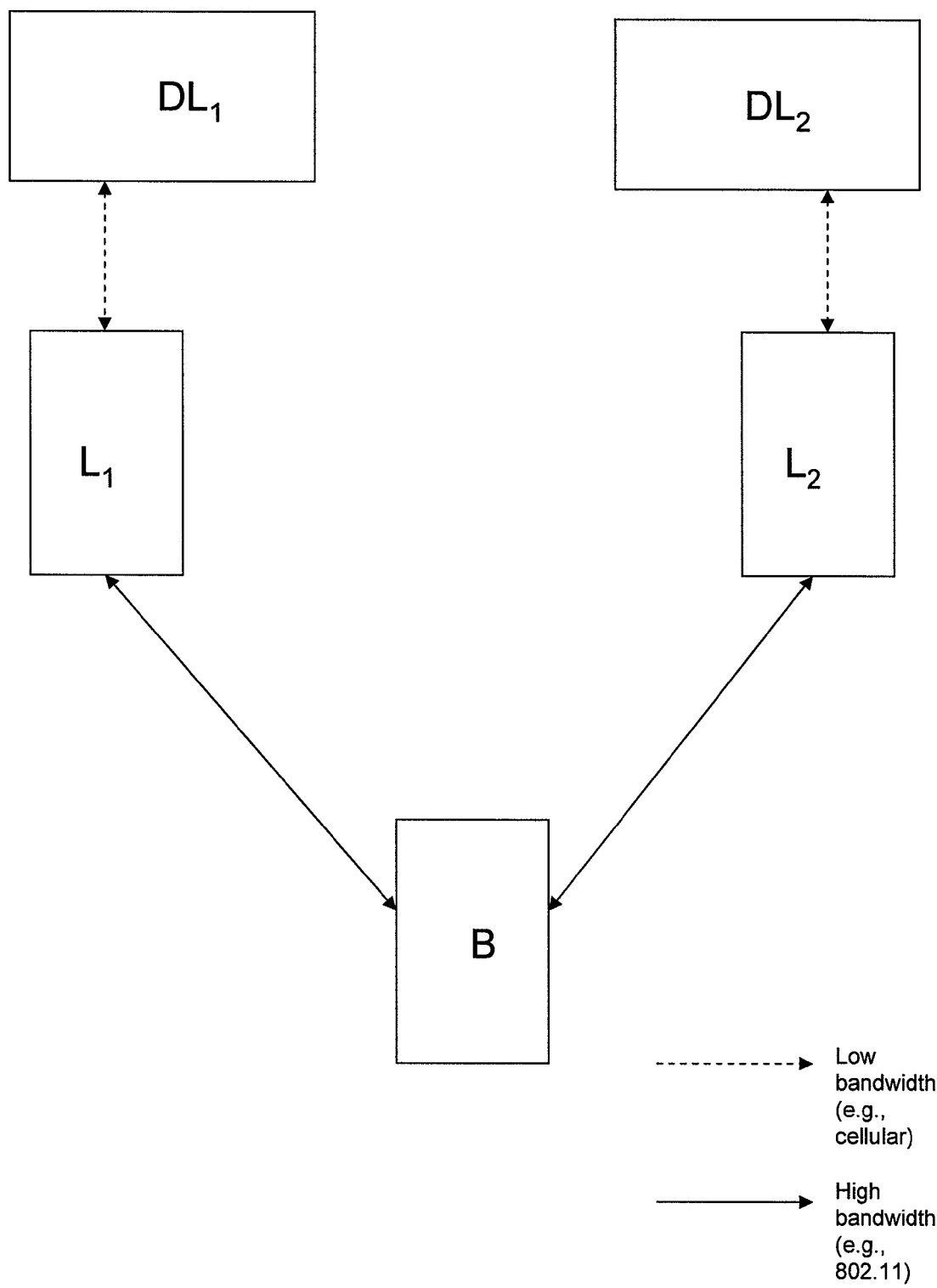

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 2C:
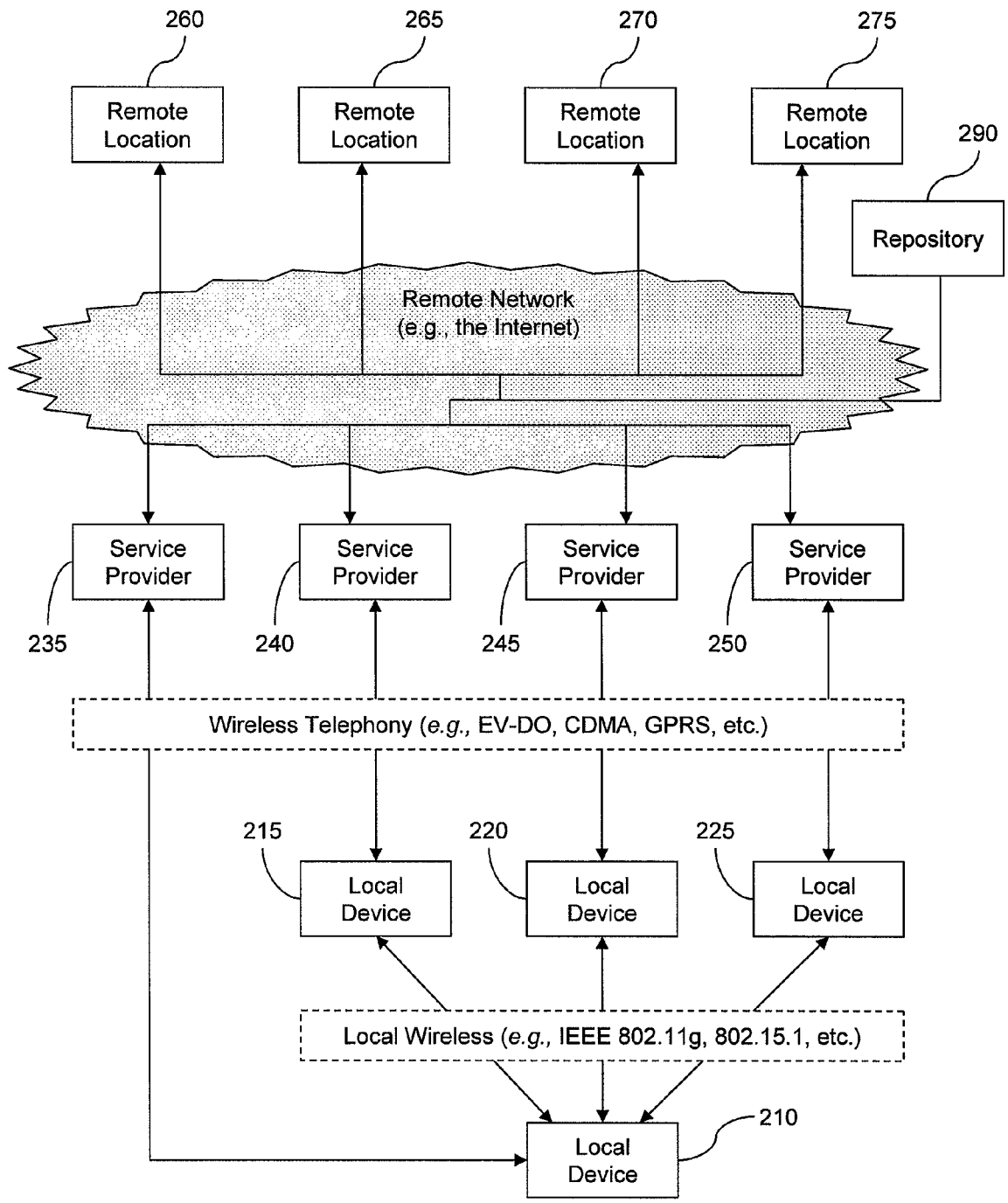

FIG. 2C is a more detailed overview of a non-gateway, peer-to-peer (P2P) bandwidth sharing architecture. In this implementation, a first node 210, second node 215, third node 220, and fourth node 225 each constitutes a respective wireless computing device such as, for example, a notebook computer, smart phone, personal digital assistant (PDA), etc. Each node 210, 215, 220, 225 has the ability to communicate (e.g., transfer data via known wireless protocols) with devices local to itself, as well as the ability to communicate with remote locations (e.g., the Internet) via an Internet Service Provider (ISP). Although four nodes are shown, any number of nodes can be used.

For example, the first node 210 may communicate with the second node 215 via any appropriate protocol, such as, for example, local wireless protocols IEEE 802.11a, 802.11b, 802.11g, IEEE 802.15.1 (i.e., Bluetooth®), IEEE 802.15.4 (e.g., Zigbee®), etc. Similarly, the first node 210 may communicate with each of the third and fourth nodes 220, 225, respectively, using any such protocol. In this manner, the first node 210 may transfer data (e.g., text file, word-processing document, spreadsheet, image file, multimedia file, etc.) to and/or from any one of the second, third, and fourth nodes 215, 220, 225.

The first node 210 may additionally communicate with a first ISP 235 via any appropriate wireless telephony (e.g., cellular) protocol, such as, for example, EV-DO, CDMA, EDGE, GPRS, etc. Similarly, second node 215 may communicate with a second ISP 240, third node 220 may communicate with a third ISP 245, and fourth node 225 may communicate with a fourth ISP 250 via any such wireless telephony protocol. The ISPs, in turn, provide connection to a remote network, such as the Internet. For example, the ISPs may provide connection to any number and type of remote locations 260, 265, 270, 275 on the Internet. Each remote location 260, 265, 270, 275 may comprise, for example, a computing device that is capable of storing data and transferring data to/from the various ISPs 235, 240, 245, 250, such as, for example, a desktop computer, server, etc., as shown in FIG. 1. In this manner, each node 210, 215, 220, and 225 may download and upload data from/to the Internet via their respective ISPs 235, 240, 245, 250. Although four ISPs and remote locations are shown, any number of ISPs and remote locations can be used. For example, two or more nodes may share a single ISP.

Still referring to the peer-to-peer implementations, the first node 210 is further provided with a peer-to-peer (P2P) networking capability, such as, for example, a torrent-type protocol such as BitTorrent® (registered trademark of BITTORRENT, INC. in the United States, other countries, or both). The P2P capability may be embodied in at least one of hardware, firmware, and software of the computing device of the first node 210. As is understood by those having skill in the art, torrent-type P2P protocols allow a device to separately download portions of a desired file from any of various remote locations, and then re-assemble the portions into the desired file.

The first node 210 may utilize the bandwidth of the other nodes 215, 220, 225 to increase the rate of data transfer between itself and the Internet. This is accomplished by the first node 210 instructing each node 215, 220, 225 to download a respective portion of the file and transfer that portion to the first node 210. The first node 210 then assembles the portions into the desired file using the torrent-type protocol. In this manner, the first node 210 overcomes its limited "skinny pipe" connection to the Internet by creating a "virtual fat pipe" by employing the bandwidth of the other nodes 215, 220, 225.

Also connected to the remote network is a repository 290. In embodiments, the repository 290 comprises a computing device (such as, for example, that described above with respect to FIG. 1) that is in communication with the nodes 210, 215, 220, 225. In accordance with aspects of the invention, the repository 290 may be structured and arranged to store information that can be used for controlling (e.g., filtering) the lending of bandwidth based upon predetermined factors, as described in greater detail below.

Figure 2D:
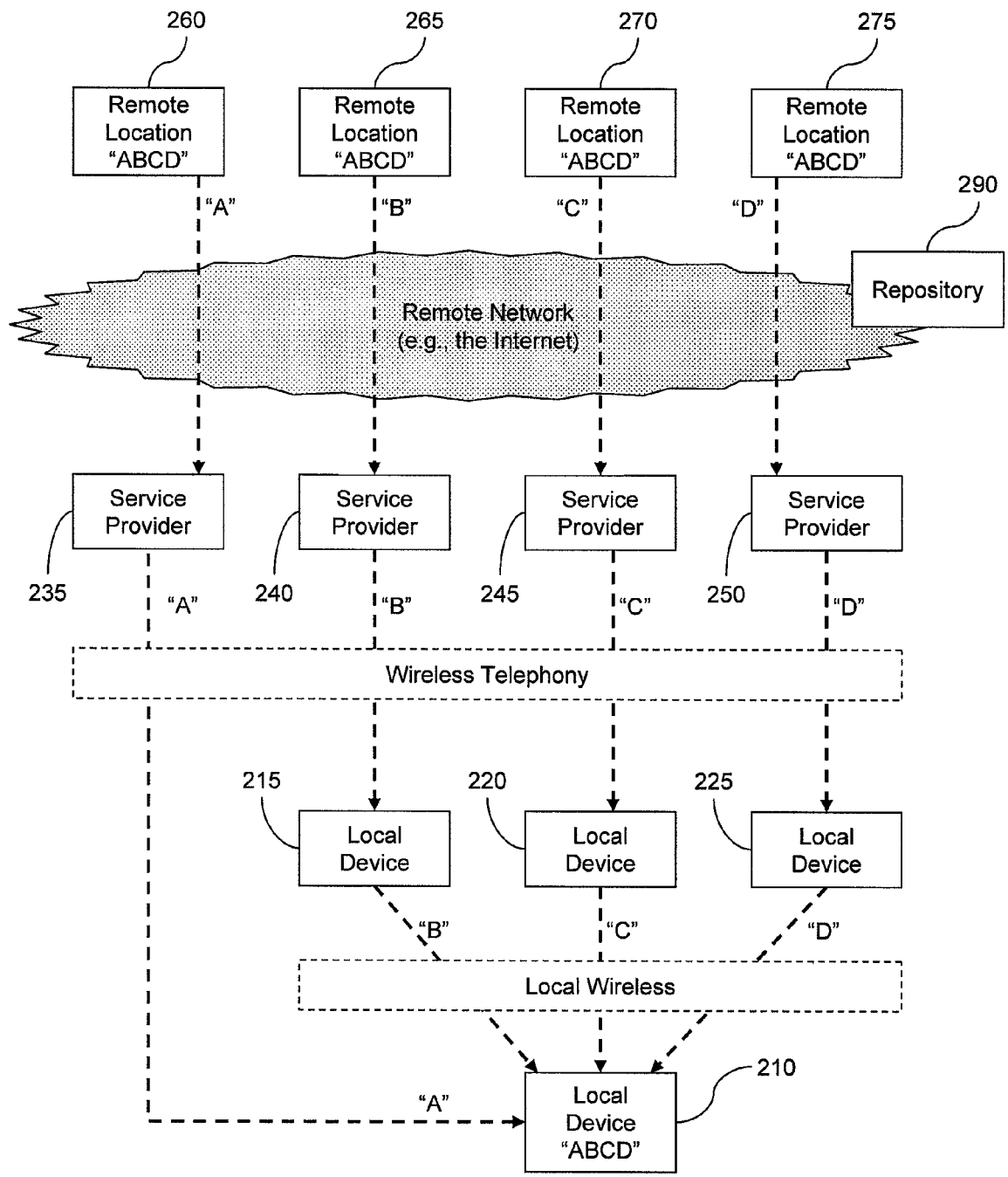

As depicted in FIG. 2D, a file made up of portions "ABCD" resides at each remote location 260, 265, 270, 275. The first node 210 downloads a first portion "A" of the file from the first remote location 260, the second node 215 downloads a second portion "B" from the second remote location 265, the third node 220 downloads a third portion "C" from the third remote location 270, and the fourth node 225 downloads a fourth portion "D" from the fourth remote location 275. The second, third, and fourth nodes transfer the respective portions to the first node, which reassembles the portions "A", "B", "C", "D" into the file "ABCD" using, for example, known torrent-type techniques.

As can be seen from the above-described example, the first node 210 uses the bandwidth of the other nodes 215, 220, 225 to effectuate a parallel, instead of serial, download of the file "ABCD". In this manner, such peer-to-peer ad hoc networks allow for faster downloading of the file to the first node 210.

To illustrate the improvement, assume file "ABCD" is 300 megabytes (MB) in size, and each node 210, 215, 220, 225 has a 1 megabit per second (Mbps) connection to its respective ISP. Further assume that the first node 210 has a 54 Mbps connection to each other node 215, 220, 225. In such a scenario, it would take about forty minutes for the first node 210 to download the file "ABCD" when acting alone. However, when the first node 210 utilizes the bandwidth of the other nodes 215, 220, 225, the download time in this example is reduced to about four minutes. It is noted that the number of nodes, ISPs, remote locations, and file portions described above are merely exemplary, and the peer-to-peer ad hoc network may be practiced with any appropriate number of nodes, ISPs, remote locations, and file portions.

Figure 3A:
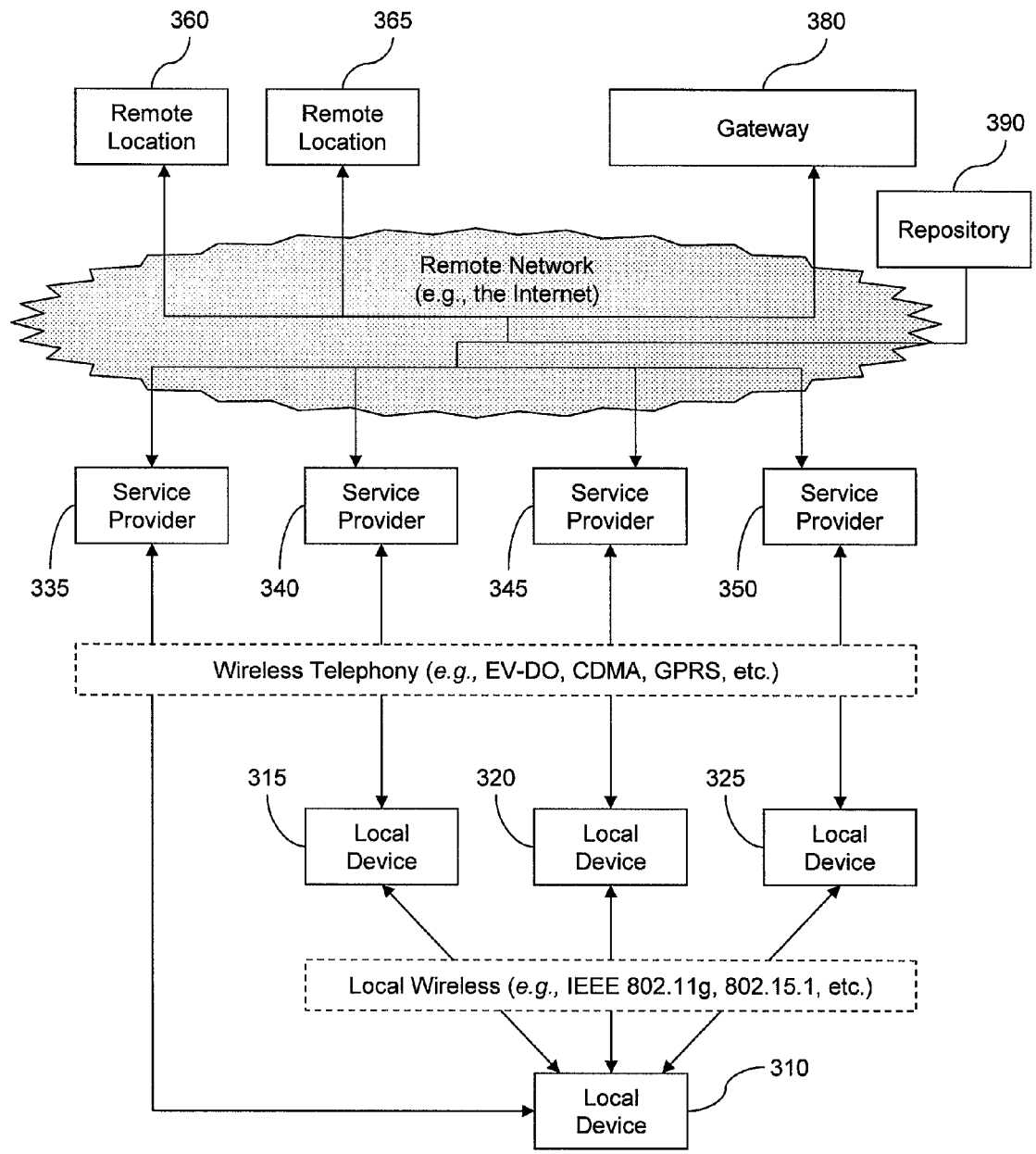
FIGS. 3A through 3C show gateway bandwidth-sharing ad hoc networks according to aspects of the invention.

FIG. 3A shows an overview of a gateway architecture of a bandwidth sharing ad hoc network. For example, a system comprises nodes 310, 315, 320, 325 and associated service providers (e.g., ISPs) 335, 340, 345, 350. Also shown is a first remote location 360 and a second remote location 365 of a remote network (e.g., the Internet). The nodes 310, 315, 320, 325, ISPs 335, 340, 345, 350, and remote locations 360, 365 are similar to those described above with respect to FIGS. 2A through 2D, such that the nodes may communicate with each other using local wireless protocols, the nodes may communicate with the ISPs using wireless telephony (e.g., cellular) protocols, and the ISPs may communicate with the remote locations over the remote network. The number of nodes, ISPs, and remote locations shown in FIG. 3A is merely exemplary, and any suitable number of nodes, ISPs, and remote locations may be used within the scope of the invention.

Also depicted in FIG. 3A is a gateway 380. The gateway 380 comprises any suitable computing device (such as, for example, that described with respect to FIG. 1) that is capable of data transfer with the ISPs 335, 340, 345, 350 and the remote locations 360, 365. For example, the gateway 380 may comprise a server that is connected to the ISPs 335, 340, 345, 350 and remote location 360, respectively, by a high speed connection (e.g., T3, cable, DSL, fiber, etc.). The gateway 380 possesses a bandwidth that is equal to or greater than the collective bandwidth of the nodes 310, 315, 320, 325, such that the gateway can facilitate substantially parallel data transfer to the nodes.

The gateway 380 further comprises file splitting and joining functionality. That is, the gateway 380 may operate to split a single data file into multiple smaller files that can later be joined to re-create the original file. Such splitting and joining functionality may be embodied in any combination of hardware and software of the gateway 380 computing device, and is known such that it does not require further explanation here. Moreover, the splitting and joining functionality may be performed on an suitable type of data file, such as text files, audio files, video files, documents, spreadsheets, etc. The splitting of a file may be thought of as a type of multiplexing, and, hence, the gateway 380 may also be referred to as a multiplexed gateway and/or a gateway multiplexer. Furthermore, although the splitting (e.g., multiplexing) and joining (e.g., demultiplexing) described herein differs from the torrent-type techniques referred to with respect to FIGS. 2C and 2D, the gateway 380 may additionally comprise torrent-type functionality.

Also connected to the remote network is a repository 390, which may be similar to that described above with respect to FIG. 2C. In accordance with aspects of the invention, the repository 390 may be structured and arranged to store information that can be used for controlling (e.g., filtering) the lending of bandwidth based upon predetermined factors, as described in greater detail below.

Figure 3B:
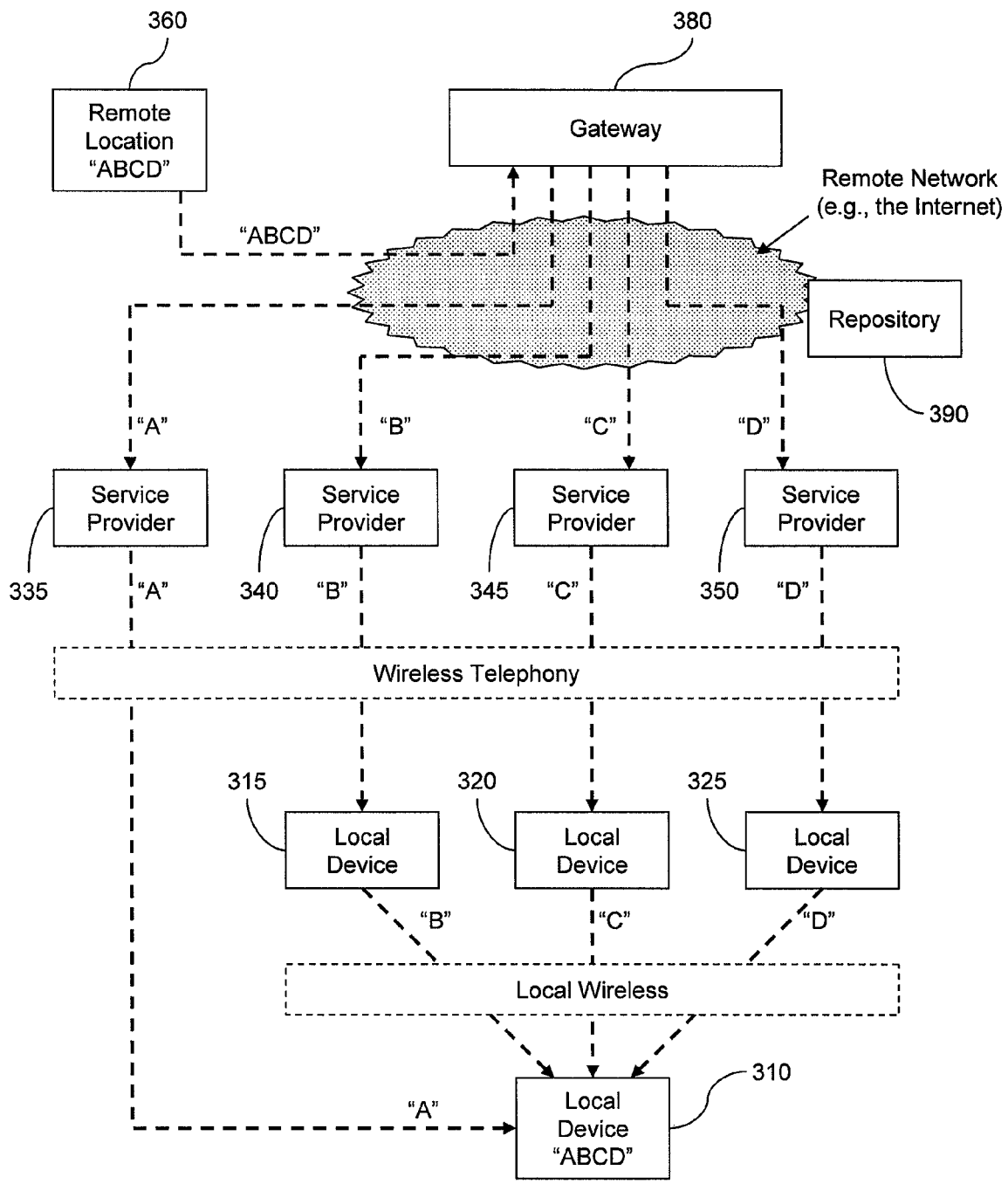

As depicted in FIG. 3B, a file made up of portions "ABCD" resides at remote location 360. The gateway 380 downloads the entire file "ABCD" from remote location 360 and splits the file into first portion "A", second portion "B", third portion "C", and fourth portion "D". The gateway sends first portion "A" to the first node 310, second portion "B" to the second node 315, third portion "C" to the third node 320, and fourth portion "D" to the fourth node 325. The second, third, and fourth nodes transfer the respective portions to the first node, which rejoins the portions "A", "B", "C", "D" into the file "ABCD" using, for example, known file rejoining techniques.

As can be seen from the above-described example, the first node 310 uses the bandwidth of the other nodes 315, 320, 325 to effectuate a parallel, instead of serial, download of the file "ABCD". In this manner, the invention allows for faster downloading of the file to the first node 310.

To illustrate the improvement, assume file "ABCD" is 300 megabytes (MB) in size, and each node 310, 315, 320, 325 has a 1 megabit per second (Mbps) connection to its respective ISP. Further assume that the first node 310 has a 54 Mbps connection to each other node 315, 320, 325. In such a scenario, it would take about forty minutes for the first node 310 to download the file "ABCD" when acting alone. However, when the first node 310 utilizes the bandwidth of the other nodes 315, 320, 325 in accordance with the invention, the download time in this example is reduced to about four minutes. It is noted that the number of nodes, ISPs, remote locations, and file portions described above are merely exemplary, and the invention may be practiced with any appropriate number of nodes, ISPs, remote locations, and file portions.

Figure 3C:
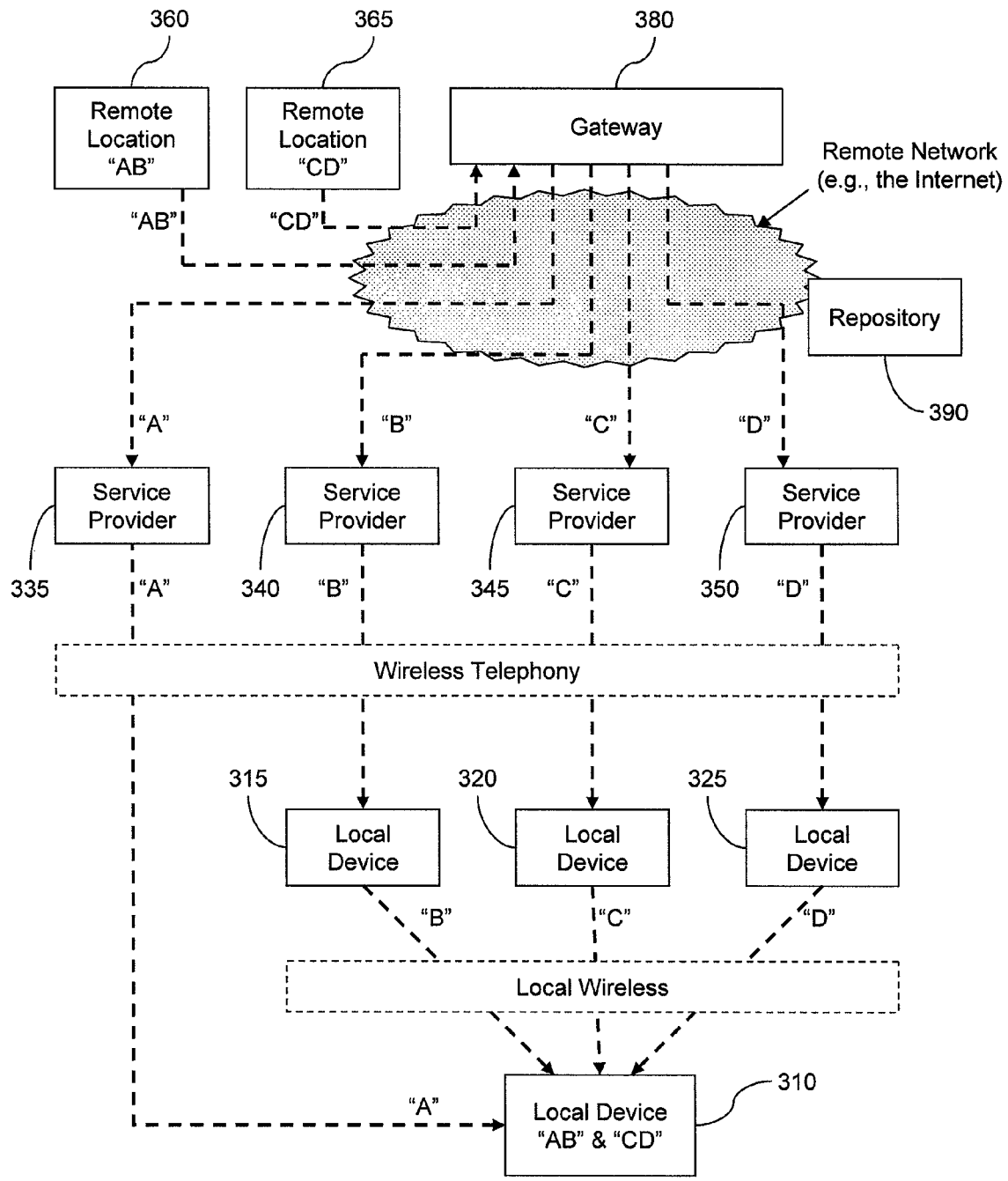

An additional implementation of a gateway environment is shown in FIG. 3C, in which plural files may be downloaded. A first file "AB" resides at first remote location 360, and a second file "CD" resides at second remote location 365. The gateway 380 downloads the entire file "AB" from the first remote location 360 and the entire file "CD" from the second remote location. The gateway 380 splits the first file "AB" into portions "A" and "B", and splits the second file "CD" into portions "C" and "D". The gateway 380 sends first portion "A" to the first node 310, second portion "B" to the second node 315, third portion "C" to the third node 320, and fourth portion "D" to the fourth node 325. The second, third, and fourth nodes transfer the respective portions to the first node, which rejoins the portions into files "AB" and "CD" using, for example, known file rejoining techniques.

Initial Formation of the Ad Hoc Network

In either the peer-to-peer or gateway environments described above, in order to form a new ad hoc network, a borrower may scan all available potential lenders and prioritize the potential lenders for a data transfer. The formation of the ad hoc network, in embodiments, may use a 'borrower/lender' table as shown in FIG. 4. In this example, the borrower or gateway (e.g., multiplexer) will broadcast the table to potential lenders which, in turn, will return the table, with information pertinent to the lender, to the borrower or the gateway. Using this information, the borrower or lender can establish an ad hoc network with lenders that meet certain criteria, e.g., reliability, speed, availability and/or costs.

In the borrower/lender table of FIG. 4, the "Node Name" column may be the unique identifier of a node such as the borrow and lenders. For example, this could be a hostname, a Bluetooth® name or any other information that can uniquely describe the node. The "Node Type" column may describe whether this node is a borrower, a lender, or a gateway. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. Illustrative cases of formation and rearrangement of a bandwidth-sharing ad hoc network architecture are set forth in co-pending application Ser. No. 11/755,775.

Filtering

When a person is participating in a bandwidth sharing arrangement as a lender, they are allowing other individuals to use their wireless connection for downloading and/or uploading data of various content. A concern for any lender is that the borrower may ask the lender to participate in illegal, unethical, and/or undesirable data transfer activity. That is, the borrower may ask the lender to transfer data such as unlicensed copyrighted material, pornography, etc. The invention allows a lender to selectively control the lending of bandwidth, whereby such illegal, unethical, and/or undesirable data transfer activity may be avoided.

According to aspects of the invention, and in either the peer-to-peer or gateway environment as described above, filtering strategies may be implemented by the participants of a bandwidth sharing ad hoc network. In embodiments, this is accomplished using predetermined parameters, such as, for example, borrower personal identity, borrower device identity, target location of data transfer, and tags associated with data, etc. In this manner, a lender may selectively deny to lend bandwidth to a borrower based upon such predetermined parameters, thereby protecting the lender from participating in illegal, unethical, and/or undesirable data transfer activity.

In implementations, a lender maintains a filter list, or lists, of predetermined parameters that can be used to filter the lending of bandwidth. For example, the lender computing device may store a data file pertaining to such filter lists in memory (such as, for example, memory similar to that described above with respect to FIG. 1). The data file may be changed, updated, etc., in any suitable known manner.

The first exemplary parameter that filtering may be based on is a filter list of usernames. In such cases, the lender will not lend bandwidth for a borrower whose username is in the filter list. The lender's filter list of usernames may be updated based upon personal experience with a borrower associated with the username, updates from a service provider, communication from other lenders, etc. In embodiments, upon receipt of a request for bandwidth from a borrower, the lender compares the borrower's username to the filter list and may deny lending bandwidth to the borrower if the username is on the filter list.

Similarly, a lender may maintain a filter list of device identifiers. In such cases, the lender will not lend bandwidth for a device whose device identifier is in the filter list. A device identifier is any unique identifier that is used by a service provider to allow a device to participate in a networked environment, such as, for example, a MAC address, an IP address, a cellular telephone number, etc. The lender's filter list of device identifiers may be updated based upon personal experience with a borrower associated with the device identifier, updates from a service provider, communication from other lenders, etc. In embodiments, upon receipt of a request for bandwidth from a borrower, the lender compares the borrower's device identifier to the filter list and may deny lending bandwidth to the borrower if the device identifier is on the filter list.

Additionally, a lender may maintain a filter list of sites that the lender will not transfer data to or from. A site may be, for example, a remote location (such as that described above with respect to FIGS. 2A through 3C) on a remote network (e.g., the Internet) that may be accessed for downloading data and/or uploading data. In embodiments, a site is identified by an Internet address that is accessed by a protocol such as http, https, ftp, etc. A lender may decline to transfer data to/from a remote location that is known or suspected of dealing with illegal, unethical, or undesirable activities. The lender's filter list of sites may be updated based upon personal experience with a site, updates from a service provider, communication from other lenders, etc. In embodiments, upon receipt of a request for bandwidth from a borrower, the lender compares the target site to the filter list and may deny lending bandwidth to the borrower if the target site is on the filter list.

Even further, a lender may maintain a filter list of words that correspond to tags. In this way, the lender will not lend bandwidth for data having tags matching words on the filter list. Tagging, also known as folksonomy, allows a file to be tagged with specific words associated with that file. The process of tagging is known and is not believed to require further explanation here. Upon receipt of a request to borrow bandwidth, the lender may obtain tags associated with the filename of the request. In embodiments, the lender obtains tags from a repository, service provider, or multiplexer that maintains (e.g., stores, updates, etc.) tags. The lender compares the tags to the filter list of words and may deny lending bandwidth to the borrower if the tag is on the filter list.

In embodiments, a particular filename may have more than one tag. For example, file "ABCD" may have the tags "copyright", "adult", and "illegal". Moreover, a tag may have been assigned to the filename more than once. Using the above, example, one hundred people may have tagged the file "ABCD" resulting in one instance of the tag "copyright", ten instances of the tag "adult", and thirty instances of the tag "illegal". According to aspects of the invention, a lender may set thresholds for each word in the filter list of words based on either a number of instances of a tag or a percentage of tags. For example, the lender may set an instance threshold of, for example, zero for the word "copyright". In this case, the lender would deny lending bandwidth for the file "ABCD" because the number of instances of the tag "copyright" (i.e., one) exceeds the threshold set by the lender for the word associated with that tag. However, if the threshold for the word "copyright" were set at three, then in the above example, the number of instances would not exceed the threshold and the lender would allow bandwidth to be borrowed for that file.

Similarly, the lender may set a percentage threshold of, for example, five percent for the word "adult". In the above example of file "ABCD", the tag "adult" was applied by ten out of one hundred people who tagged the file. Therefore, the lender may deny lending bandwidth for this file because the percentage of tags (i.e., ten percent) exceeds the threshold (e.g., five percent).

Even further, a threshold may be set based upon multiple occurrences of different tags. For example, a lender may define a threshold of, for example, one for the sum of instances of the tags "copyright" and "illegal". In the above noted example of file "ABCD", the sum of instances of the tags "copyright" and "illegal" equals thirty-one, which exceeds the threshold set at one. Therefore, the lender may refuse to lend bandwidth for downloading/uploading this file.

The values of thresholds described above are merely exemplary, and any suitable value may be used in accordance with the invention. Moreover, the parameters of borrower personal identity, borrower device identity, target location of data transfer, and tags associated with data are merely exemplary, and any suitable parameter or parameters may be used in accordance with the invention.

Moreover, while filter lists have been described as being maintained by a lender, such lists may additionally or alternatively be stored and maintained by a third party, such as, for example, a service provider, gateway (e.g., multiplexer, as described above with respect to FIGS. 3A-3C), repository (e.g., as described above with respect to FIGS. 2A-3C), etc. In implementations, a third party that stores a filter list may further operate to control the lending of bandwidth without any input from the lender. That is, the third party may prohibit the lending of bandwidth based upon its own predetermined parameters, which may be different from those defined by any single lender. In this manner, a third party (e.g., service provider) may protect itself from potentially illegal, unethical, or undesirable data transfer activities of its users.

Processes of the Invention

The steps of the flow diagrams described herein may be implemented in the environment of FIG. 1. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
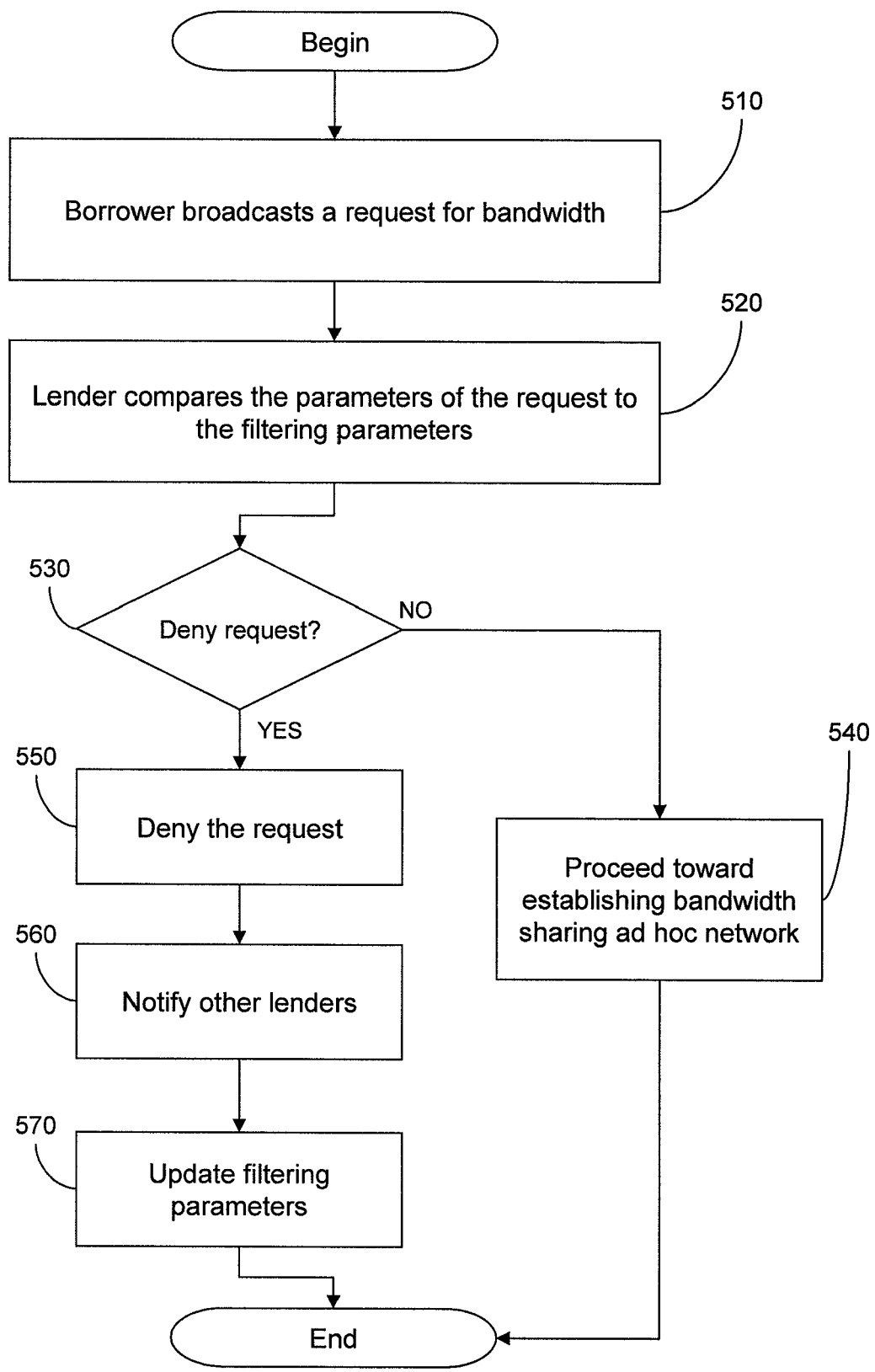
FIGS. 5 and 6 show flow diagrams depicting implementations of methods according to aspects of the invention.

FIG. 5 shows a flow diagram depicting steps of a first method for transferring data according to aspects of the invention. At step 510, a borrower broadcasts a request for bandwidth to other local devices. This may be accomplished as described above with respect to FIGS. 2A through 4.

At step 520, a lender that has received the borrowing request compares the parameters of the request to the filtering parameters. In embodiments, the lender compares at least one of: the borrower username to a filter list of usernames; the borrower device identifier to a filter list of device identifiers; the target site of the data transfer to a filter list of sites; and/or tags associated with the data to a filter list of words. The filter lists may be stored locally by the lender and/or may be accessed from a third party (e.g., repository, service provider, gateway, etc.) upon receipt of the borrowing request. If a tag comparison is used, the tags associated with the requested filename may be retrieved by the lender from a third party (e.g., repository, service provider, gateway, etc.) upon receipt of the borrowing request.

At step 530, the lender decides whether or not to deny the borrowing request. The decision is based upon the above-noted comparisons of step 520. In embodiments, the decision is automatically made by logic programming resident on the lender computing device. That is, the lender computing device may comprise hardware and/or software (e.g., similar to that described above with respect to FIG. 1) structured and arranged to interpret the results of the comparison and decide whether or not to deny the borrowing request. For example, if there is a match to any filter list and/or if a tag threshold is met, then the lender device may automatically decide to deny lending bandwidth to the borrower.

Additionally or alternatively, if there is a match to any filter list and/or if a tag threshold is met, then the lender device may prompt the user to decide whether or not to deny lending bandwidth. Such a prompt may comprise, for example, a display on a graphical user interface (GUI) indicating the existence of a match to the filter list and/or tag threshold. The prompt may further comprise a query on the GUI requiring the user to enter yes (e.g., deny the request) or no (e.g., do not deny the request). The user may enter the answer to a prompt in any suitable manner, such as, for example, keystroke, mouse pointer, touchscreen, etc.

If, at step 530, the lender decides not to deny the request (i.e., the lender will lend bandwidth to the borrower), then the process proceeds to step 540 where the ad hoc network is established and data may be transferred. This may be accomplished as described above with respect to FIGS. 2A through 4. Illustrative cases of formation and rearrangement of a bandwidth-sharing ad hoc network architecture are set forth in co-pending application Ser. No. 11/755,780, copending application Ser. No. 11/755,775, and copending application Ser. No. 11/755,808.

If, however, at step 530 the lender decides to deny lending bandwidth, then the process proceeds to step 550 where the lender denies the borrower's request. In embodiments, the lender may send a message to the borrower indicating the denial. The message may comprise, for example, an indication of the denial and a reason for the denial. Alternatively, the lender may simply not respond to the borrower's request, in which case the borrower will conclude that this lender is unavailable.

Optionally, at step 560, the lender may inform other lenders of the decision to deny lending bandwidth. In embodiments, the lender may broadcast a message using any suitable local wireless protocol indicating the denial and the reason for denial (e.g., the borrower identity, the borrower device identity, the target site, tags, etc.). In this manner, other lenders may update their respective filter lists.

Optionally, at step 570, the lender may update his or her filter lists based upon the denial. For example, if the denial is based upon the borrower's username matching a username on a filter list, then the lender may update the device identifier filter list to include the device identifier that the borrower used to make the denied request. Other lists may be updated in a similar fashion.

Figure 6:
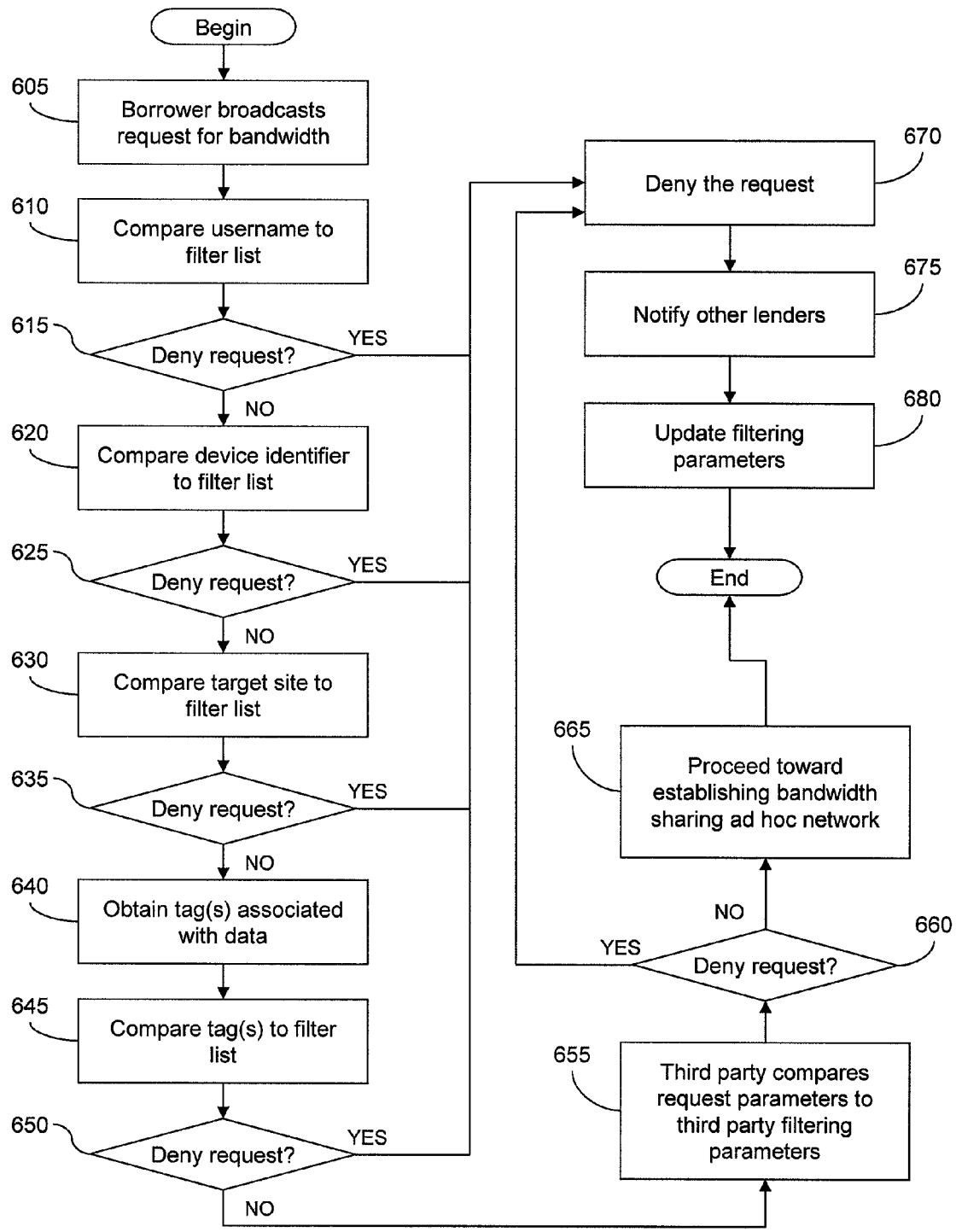

FIG. 6 shows a detailed example of the general method that is described above with respect to FIG. 5. At step 605, a borrower broadcasts a request for sharing bandwidth. This may be accomplished as described above with respect to FIG. 4. In embodiments, the request includes: the identification of the borrower (e.g., username), identification of the borrower's device (e.g., device identifier); identification of the data (e.g., filename); and/or identification of the target location of the data transfer (e.g., site).

At step 610, a lender that has received the request compares the borrower's username to a filter list of usernames. The filter list may be stored locally (e.g., in memory of the lender device) and accessed upon receipt of the request. Additionally or alternatively, the lender may obtain a filter list of usernames from a third party, such as, for example, a service provider, repository, gateway, etc., upon receipt of the request. The third party may provide such filter lists on a subscription, fee, or advertising basis.

At step 615, the lender decides whether or not to deny the request based upon the comparison of step 610. For example, the lender may decide to deny the request if the username matches a username on any filter list that is checked in step 610. If the lender decides to deny the request, then the process proceeds to step 670, which is described in greater detail below. If however, the user decides not to deny the request, then the process proceeds to step 620.

At step 620, the lender compares the borrower's device identifier to a filter list of device identifiers. The filter list may be stored locally (e.g., in memory of the lender device) and accessed upon receipt of the request. Additionally or alternatively, the lender may obtain a filter list of device identifiers from a third party, such as, for example, a service provider, repository, gateway, etc., upon receipt of the request. The third party may provide such filter lists on a subscription, fee, or advertising basis.

At step 625, the lender decides whether or not to deny the request based upon the comparison of step 620. For example, the lender may decide to deny the request if the borrower's device identifier matches a device identifier on any filter list that is checked in step 620. If the lender decides to deny the request, then the process proceeds to step 670, which is described in greater detail below. If, however, the user decides not to deny the request, then the process proceeds to step 630.

At step 630, the lender compares the target site of the requested data transfer to a filter list of sites. The filter list may be stored locally (e.g., in memory of the lender device) and accessed upon receipt of the request. Additionally or alternatively, the lender may obtain a filter list of sites from a third party, such as, for example, a service provider, repository, gateway, etc., upon receipt of the request. The third party may provide such filter lists on a subscription, fee, or advertising basis.

At step 635, the lender decides whether or not to deny the request based upon the comparison of step 630. For example, the lender may decide to deny the request if the target site matches a site on any filter list that is checked in step 630. If the lender decides to deny the request, then the process proceeds to step 670, which is described in greater detail below. If, however, the user decides not to deny the request, then the process proceeds to step 640.

At step 640, the lender obtains tags associated with the filename of the requested data transfer. In embodiments, the lender sends the filename to a third party (e.g., service provider, repository, gateway, etc.), and receives back the tags associated with the filename. Such retrieval of tags is known and does not require further explanation here. The third party may provide the tags on a subscription, fee, or advertising basis.

At step 645, the lender compares the tags to a filter list of words. The filter list may be stored locally (e.g., in memory of the lender device) and accessed upon receipt of the request. Additionally or alternatively, the lender may obtain a filter list of words from a third party, such as, for example, a service provider, repository, gateway, etc., upon receipt of the request. The third party may provide such filter lists on a subscription, fee, or advertising basis.

In implementations, the comparison comprises comparing the tags to predetermined thresholds associated with the filter list of words. For example, at least one word in the filter list of words may comprise a threshold value pertaining to the number of instances of a tag and/or a percentage occurrence of a tag. The comparison in step 645 determines whether, for any word of the filter list, the number of instances of a tag or the percentage occurrence of a tag equals or exceeds the associated threshold.

At step 650, the lender decides whether or not to deny the request based upon the comparison of step 645. For example, the lender may decide to deny the request if the number of occurrences of a tag exceeds the threshold value for the word associated with that tag. If the lender decides to deny the request, then the process proceeds to step 670, which is described in greater detail below. If, however, the user decides not to deny the request, then the process proceeds toward establishing the ad hoc network.

In gateway environments, such as that described above with respect to FIGS. 3A-3C, optional step 655 may be performed. At step 655, the gateway (e.g., multiplexer) compares the parameters of the borrower's request to at least one gateway filter list. The gateway filter list may comprise at least one of: a gateway username filter list, a gateway device identifier filter list, a gateway site filter list, and a gateway tagged word filter list. The content of these gateway filter lists may be different from that of any lender. In embodiments, the comparison at step 655 is performed similarly to that of steps 610, 620, 630, and 645, except that the gateway filter lists are used.

At step 660, the gateway decides whether or not to deny the borrower's request based upon the comparison of step 655. In embodiments, the gateway's decision to deny the request overrides a lender's decision to the contrary. Because the gateway functions as a conduit for the data transfer in the environment shown in FIGS. 3A-3C, the gateway may effectively prevent the requested data transfer if the gateway decides to deny the request at step 660. In this manner, the gateway provides an extra layer of control over the users of its services. If the gateway decides to deny the request, then the process proceeds to step 670, which is described in greater detail below. If however, the gateway decides not to deny the request, then the process proceeds toward establishing the ad hoc network.

If the lender (and, optionally, the gateway) does not deny the request, then at step 665 the process proceeds toward the establishment of the ad hoc network. Illustrative cases of establishing a bandwidth-sharing ad hoc network are set forth in co-pending application Ser. No. 11/755,780, copending application Ser. No. 11/755,775, and copending application Ser. No. 11/755,808.

If, however, at any step the lender (and, optionally, the gateway) decides to deny lending bandwidth, then the request is denied at step 670. In embodiments, the lender may send a message to the borrower indicating the denial. The message may comprise, for example, an indication of the denial and a reason for the denial. Alternatively, the lender may simply not respond to the borrower's request, in which case the borrower will conclude that this lender is unavailable.

Optionally, at step 675, the lender may inform other lenders of the decision to deny lending bandwidth. In embodiments, the lender may broadcast a message using any suitable local wireless protocol indicating the denial and the reason for denial (e.g., the borrower identity, the borrower device identity, the target site, tags, etc.). In this manner, other lenders may update their respective filter lists.

Optionally, at step 680, the lender may update its filter lists based upon the denial. For example, if the denial is based upon the borrower's username matching a username on a filter list, then the lender may update the device identifier filter list to include the device identifier that the borrower used to make the denied request. Other lists may be updated in a similar fashion.

In embodiments of the invention, each device of an ad hoc network comprises hardware and/or software (e.g., similar to that described with respect to FIG. 1) that performs some or all of the functions described herein. For example, a wireless device may download and install a software application that allows the wireless device to perform at least one of: establish a relationship with a gateway, broadcast requests for borrowing bandwidth, respond to requests for borrowing bandwidth, generate a borrower/lender table, determine lender solutions, store and modify filter lists, etc. Such software may, for example, be created by and available for download from a service provider. In even further implementations, the repository may be the service provider.

While the invention has been described in terms of embodiments, those skilled in the art will recognize that the invention can be practiced with modifications and in the spirit and scope of the appended claims. For example, while the embodiments have been described with one, two, or three lenders, those skilled in the art will recognize that the invention can be practiced with any number of lenders, files, file portions, ISPs, and/or remote locations.

What is claimed:

1. A method, comprising:
    maintaining at least one filtering parameter associated with formation of a bandwidth sharing ad hoc network; and
    preventing data transfer across the bandwidth sharing ad hoc network when a parameter of a request to establish the bandwidth sharing ad hoc network corresponds to the at least one filtering parameter,
    wherein the ad hoc network comprises a borrower device in communication with a remote network, and a lender device in communication with the remote network and the borrower device;
    the lender device selectively lends bandwidth to the borrower device for downloading data from or uploading data to the remote network; and
    at least one of the maintaining and the preventing data transfer is performed by the lender device comprising a computer device having a processor.

2. The method of claim 1, wherein the maintaining comprises at least one of storing and updating the at least one filtering parameter.

3. The method of claim 1, wherein the at least one filtering parameter comprises at least one list of: at least one username, at least one device identifier, at least one target site, and at least one word associated with a tag.

4. The method of claim 1, wherein the at least one filtering parameter comprises: a list of at least one word associated with a tag; and at least one threshold value associated with the at least one word.

5. The method of claim 4, wherein the at least one threshold value comprises at least one of a number of instances of a tag or a percentage of tags.

6. The method of claim 1, wherein the steps of claim 1 are provided by a service provider under a subscription and/or fee agreement and/or based on advertising content to one or more third parties.

7. The method of claim 1, wherein a service provider at least one of creates, maintains, deploys and supports a computer infrastructure that performs the steps of claim 1.

8. A method, comprising:
    a lender receiving a request from a borrower device to lend bandwidth to the borrower in a bandwidth sharing ad hoc network, wherein the lender comprises a lender device comprising a computing device configured to communicate with the borrower device via the bandwidth sharing ad hoc network using a local wireless communication protocol;
    the lender comparing the request to at least one filtering parameter; and
    the lender denying or granting the request based upon the comparing,
    wherein the ad hoc network comprises the borrower device in communication with a remote network, and the lender device in communication with the remote network and the borrower device;
    the lender device selectively lends bandwidth to the borrower device for downloading data from or uploading data to the remote network.

9. The method of claim 8, wherein the at least one filtering parameter comprises at least one list of: at least one username, at least one device identifier, at least one target site, and at least one word associated with a tag.

10. The method of claim 9, further comprising obtaining the at least one list from a third party after the receiving and before the comparing.

11. The method of claim 9, further comprising updating the at least one list after the denying.

12. The method of claim 8, further comprising notifying other lenders after the denying.

13. The method of claim 8, wherein the at least one filtering parameter comprises:
    a list of at least one word associated with a tag; and
    at least one threshold value associated with the at least one word.

14. The method of claim 13, wherein the at least one threshold value comprises at least one of a number of instances of a tag or a percentage of tags.

15. A method, comprising:
    providing a computer infrastructure operable to:
    store at least one filtering parameter associated with forming a bandwidth sharing ad hoc network between a borrower and a lender, wherein the borrower and the lender are associated with respective computer devices configured to communicate with each other via local wireless communication protocol; and
    based upon a request of from the borrower to the lender to establish the bandwidth sharing ad hoc network, at least one of: transmit the at least one filtering parameter to the lender, and prevent data transfer for the borrower across the ad hoc network based upon the at least one filtering parameter,
    wherein the ad hoc network comprises a borrower device in communication with a remote network, and a lender device in communication with the remote network and the borrower device;
    the lender device selectively lends bandwidth to the borrower device for downloading data from or uploading data to the remote network; and the lender device performs at least one of the storing and the preventing data transfer.

16. The method of claim 15, wherein the at least one filtering parameter comprises at least one list of: at least one username, at least one device identifier, at least one target site, and at least one word associated with a tag.

17. The method of claim 15, wherein the at least one filtering parameter comprises:
a list of at least one word associated with a tag; and
at least one threshold value associated with the at least one word.

18. The method of claim 17, wherein the at least one threshold value comprises at least one of a number of instances of a tag or a percentage of tags.

19. The method of claim 15, wherein the computer infrastructure is further operable to update the at least one filtering parameter.

20. The method of claim 15, wherein at least one of the storing, the transmitting, and the preventing are provided by a service provider under a subscription and/or fee agreement and/or based on advertising content to one or more third parties.

21. A computer program product comprising a computer usable storage medium having a computer readable program embodied in the storage medium, wherein the computer readable program when executed on a computing device causes the computing device to:
maintain at least one filtering parameter associated with formation of a bandwidth sharing ad hoc network; and
based upon the at least one filtering parameter, at least one of: provide the at least one filtering parameter to a lender of the ad hoc network, and prevent data transfer across the ad hoc network,
wherein the ad hoc network comprises a borrower device in communication with a remote network, and a lender device in communication with the remote network and the borrower device;
the lender device selectively lends bandwidth to the borrower device for downloading data from or uploading data to the remote network; and
at least one of the maintaining and the preventing data transfer is performed by the lender device.

22. The computer program product of claim 21, wherein the maintaining comprises at least one of storing and updating the at least one filtering parameter.

23. The computer program product of claim 21, wherein the at least one filtering parameter comprises: a username filter list comprising at least one username, a device identifier filter list comprising at least one device identifier, a site filter list comprising at least one target site, and a word filter list comprising at least one word associated with a tag.

24. The computer program product of claim 21, wherein the at least one filtering parameter comprises:
a list of at least one word associated with a tag; and
at least one threshold value associated with the at least one word.

25. The computer program product of claim 24, wherein the at least one threshold value comprises a percentage of tags.

26. A system comprising a server having a database containing data associated with a borrower, and at least one of a hardware and software component configured to:
maintain at least one filtering parameter associated with establishing a bandwidth sharing ad hoc network comprising the borrower and a lender, wherein the borrower and the lender are configured to communicate in the bandwidth sharing ad hoc network via local wireless communication protocol;
compare a request of the borrower to borrow bandwidth from the lender to the at least one filtering parameter; and
deny or grant the request based upon the comparing,
wherein the ad hoc network comprises a borrower device in communication with a remote network, and a lender device in communication with the remote network and the borrower device;
the lender device selectively lends bandwidth to the borrower device for downloading data from or uploading data to the remote network; and
at least one of the maintaining and the preventing data transfer is performed by the lender device.

27. The system of claim 26, wherein the maintaining comprises at least one of storing and updating at least one list of parameters.

28. The system of claim 26, wherein the comparing comprises at least one of:
comparing a username of the borrower to a filter list of usernames;
comparing a device identifier of the borrower to a filter list of device identifiers;
comparing a target site to a filter list of sites; and
comparing at least one tag associated with the request to filter list of words.

29. The system of claim 26, further comprising providing the at least one filtering parameter to the lender.

30. The system of claim 26, wherein the maintaining, the comparing, and the denying or granting are provided by a service provider under a subscription and/or fee agreement and/or based on advertising content to one or more third parties.

* * * * *